April 29, 1969   J. W. TIBBET   3,440,678
COMBINATION WINDSHIELD WIPER BLADE AND WASHER ASSEMBLY
Filed Oct. 24, 1966
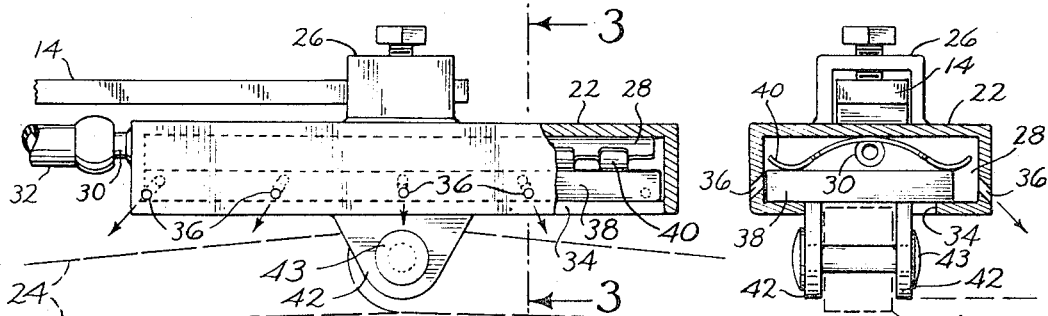
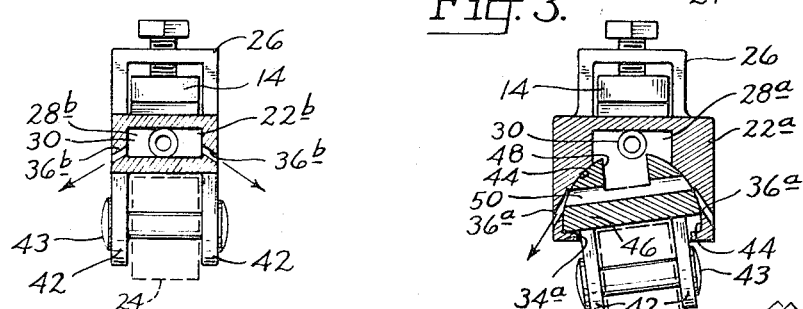
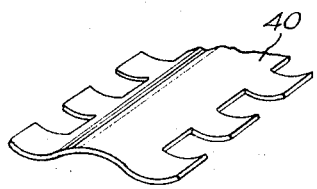
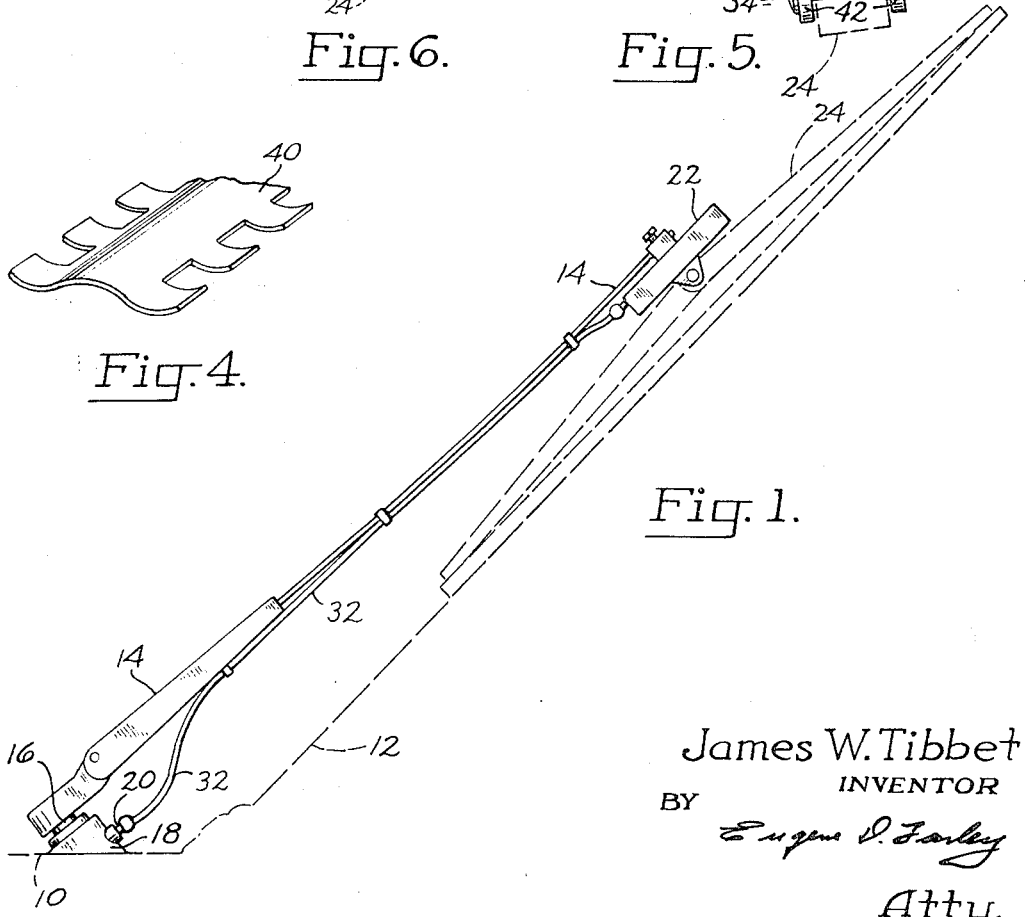
James W. Tibbet
INVENTOR
BY Eugene D. Farley
Atty.

United States Patent Office 3,440,678
Patented Apr. 29, 1969

3,440,678
COMBINATION WINDSHIELD WIPER BLADE AND WASHER ASSEMBLY
James W. Tibbet, Rte. 1, Box 94, Gold Hill, Oreg. 97525
Filed Oct. 24, 1966, Ser. No. 589,016
Int. Cl. B60s 1/02
U.S. Cl. 15—250.04     5 Claims

ABSTRACT OF THE DISCLOSURE

A vehicle windshield wiper blade is fitted with a jet type washer for directing cleaning fluid under pressure aganist the windshield wiper blade. The jet is directed against the windshield in a precise location ahead of the blade in both its forward and reverse strokes.

---

This invention relates to a vehicle windshield wiper blade fitted with a jet type washer for directing cleaning fluid under pressure against the windshield ahead of the blade.

It is the common experience of all motorists using conventional windshield wipers and washers that the flow of cleaning fluid from the washer is directed inaccurately and inefficiently in that, depending in part upon the speed of the vehicle, the fluid impinges upon the windshield either above, below or behind the wiper blade. In extreme instances it may miss the windshield altogether. This inefficiency obviously causes inconvenience to the motorist and creates a hazardous driving situation.

It is the general purpose of the present invention to provide a windshield wiper blade assembly fitted with a washer which directs the flow of cleaning fluid accurately and reliably directly ahead of the wiper blade on both of its oscillating strokes, thereby greatly increasing the efficiency of the blade operation.

It is another object of the present invention to provide a combination windshield wiper blade and washer assembly which is adapted for use with conventional windshield wipers, either as an integral unit or as an easily installed attachment.

The manner in which the foregoing and other objects of this invention are accomplished will be apparent from the acompanying specification and claims considered together with the drawings, wherein:

FIG. 1 is a view in elevation of a windshield wiper installation including the combination wiper blade and washer assembly of the present invention;

FIG. 2 is an enlarged detail view in elevation of a head structure used in conjunction with the presently described assembly, partly broken away, better to show the interior construction;

FIG. 3 is a transverse sectional view taken along line 3—3 of FIG. 2;

FIG. 4 is a fragmentary, perspective view of a spring member employed in the assembly of FIGS. 1, 2 and 3; and FIGS. 5 and 6 are transverse sectional views, similar to FIG. 3, but illustrating two alternate forms of the invention.

Generally stated, the combination windshield wiper blade and washer assembly of the present invention comprises a wiper blade head provided with means for attachment to the outer, swinging end of the wiper arm. The head has a central chamber provided with an inlet port, and at least two discharge ports arranged one on each side of the head. The discharge ports are angled to direct the flow of pressurized fluid against the windshield surface on one side or the other of the wiper blade.

Conduit means connects the inlet port of the head with the source of fluid under pressure. Valve means are provided in the chamber for adjustment alternately between a first position wherein it closes the discharge port on one side and opens that on the other, and a second position wherein it closes the latter port and opens the former.

A wiper blade is arranged substantially parallel to the arm. Connecting means connect the blade to the valve means in such a manner that the connecting means acts as a valve operator, being actuatable by frictional contact of the blade with the windshield to alternate the valve means between its first and second positions responsively to the direction of motion of the blade. This directs a jet of cleaning fluid against the windshield in a precise location ahead of the blade, no matter what its direction of motion.

Considering the foregoing in greater detail and with particular reference to the drawings:

As shown in FIG. 1, the assembly is applicable in the usual windshield washer and wiper installation mounted on the cowl 10 of an automobile in working relation to the windshield 12. It may be used in conjunction with a conventional wiper arm 14, the lower end of which is connected to an oscillating drive shaft 16 extending from a housing 18, into which is built a fitting 20 connected to a source of cleaning fluid under pressure, and usually coupled to a jet (not illustrated) which directs the flow of fluid against the windshield from a location beneath the wiper blade.

The upper end of arm 14 mounts the combination wiper blade and washer assembly which is the subject matter of the present invention. This assembly broadly comprises a wiper blade head 22 which in turn supports a wiper blade 24 of conventional construction.

The construction of the wiper blade head in a first embodiment of the invention is illustarted in FIGS. 2, 3 and 4.

As viewed in these figures, the head comprises an elongated, hollow case arranged generally parallel to arm 14 and secured to the outer end of the arm by means of a screw clamp 26. The hollow interior of the case provides a chamber 28 which communicates through an inlet port 30 with a length of flexible tubing 32. One end of the tubing may be pressed over the inlet port, while the other end may be connected to fitting 20. This supplies cleaning fluid under pressure to chamber 28.

The invention thus is applicable as an attachment to a conventional wiper arm and washer installation. However, in the alternative, a special arm, not illustrated, may be provided which is recessed to accommodate tubing 32 so that it is protected and hidden from sight.

The under side of case 22 is provided with a guideway 34. The side walls of the case are provided with a plurality of longitudinally spaced discharge ports 36, preferably arranged in two rows, one row on each side of the case. The ports of each row are angled in the direction of the windshield surface on the corrseponding side of wiper blade 24.

Valve means are provided selectively to open one row or the other of the discharge ports, thereby directing the fluid jets against the windshield.

In the FIGS. 2–4 form of the invention, the valving element comprises a rectangular block 38 having a width somewhat less than the width of chamber 28, but sufficient to span guideway 34 on the bottom thereof. The under surface of valving element 38 is in sliding contact with the floor of chamber 28 against which it is pressed by an elongated, serrated, leaf spring 40, the construction of which is shown in greater detail in FIG. 4.

The end walls of valving element 38 serve as valve closures since, when the block is in either of its extreme positions, against one or the other of the side walls of case 22, it closes off one row of discharge ports 36 while opening the other row thereof.

Valving element 38 is operated by means of arms 42 which are fixed to the underside of the element and project through guideway 34. The arms in turn are secured by means of a pin 43 to the mounting attachment of wiper blade 24.

The arrangement above described permits alternate adjustment of the valve between a first position wherein it closes the discharge ports of one row and opens the discharge ports of the other, and a second position wherein this adjustment is reversed. The adjustment is made automatically with each oscillating stroke of the wiper blade since the block is actuated by frictional contact of the moving blade with the windshield. This in turn directs a jet of cleaning fluid against the windshield in a location directly ahead of the blade, on each stroke of the latter.

The form of the invention illustrated in FIG. 5 is similar, except that a different type of sliding valve is employed alternately to open and close the discharge ports on the opposite sides of the head.

Thus in this form of the invention head 22a comprises a hollow case having an elongated central chamber 28a. The chamber is fitted with an inlet port 30, analogous to inlet port 30 of the previously described embodiment, and with a plurality of discharge ports 36a arranged in rows, one row on each side of the head. Like discharge ports 36, ports 36a are directed toward the windshield on opposite sides of blade 24.

The floor of the case is formed with a guide opening 34a, analogous to guide opening 34 of the previously described embodiment. However, as a novel feature of construction the case is provided with an arcuate valve seat 44 which communicates with discharge ports 36a.

The valve seat thus provided accommodates a sliding valve core 46, the peripheral surface of which is in sliding contact with the seat. The valve core preferably is semicircular in cross section. Its flat under surface is retained by the floor of case 22A. A channel 48 communicates with chamber 28A, and also with a plurality of cross bores 50 extending through the core and interconnecting the opposite ones of each pair of discharge ports 38a.

Valve core 46 is connected rigidly to arms 42, as are arms 42 of the previously described embodiment. These arms serve the dual functions noted before, of connecting the valve core to blade 24, thereby mounting the latter, and of serving as a valve actuator.

With respect to the latter function, it will be apparent that as wiper arm 14 oscillates in the usual manner, frictional engagement of wiper blade 24 with the windshield induces a corresponding rocking movement in arcuate valve core 44. This in turn alternately opens and closes the respective rows of discharge ports 36a, passing jets of cleaning fluid under pressure ahead of the blade on each of its passes.

The form of the invention illustrated in FIG. 6 represents a simplified embodiment wherein jets of cleaning fluid under pressure are discharged simultaneously on both sides of the wiper blade.

Thus in this form of the invention head 22b comprises a hollow case having an elongated central chamber 28b.

The chamber is fitted with an inlet port 30, as in the previously described embodiment and with a plurality of discharge ports 36b arranged in rows, one row on each side of the head. Like discharge ports 36 and 36a, ports 36b are directed toward the windshield on opposite sides of blade 24.

Connecting arms 42 are fastened rigidly to the under side of case 22b. These arms mount blade 24 through the agency of pin 43. Accordingly, when fluid under pressure is supplied to chamber 28b through inlet port 30, it is discharged simultaneously through openings 36B on both sides of the case, spraying the windshield on both sides of wiper blade 24.

It thus will be apparent that by the present invention I have provided a windshield wiper blade and washer assembly which in its various forms directs the flow of cleaning fluid accurately and reliably, directly ahead of the wiper blade on both of its oscillating strokes, thereby greatly increasing the efficiency of the blade operation. Still further, I have provided a combination windshield wiper blade and washer assembly which is adapted for use with a conventional windshield wiper, either as an integral unit or as an easily installed attachment.

Having thus described my invention, I claim:

1. In a windshield wiper unit including an oscillating wiper arm and a source of cleaning fluid under pressure, a combination wiper blade and washer assembly comprising:
 (a) a wiper blade head,
 (b) means for attaching the head to an end of the arm,
 (c) the head having therein a chamber provided with an inlet port, at least two discharge ports arranged one on each side of the head, and a guideway extending through the bottom of the head,
 (d) conduit means connecting the inlet port of the head with the source of fluid under pressure,
 (e) valve means in the chamber arranged for adjustment alternately between a first position wherein it closes one discharge port and opens the other, and a second position wherein it closes the said other discharge port and opens the said one discharge port,
 (f) a wiper blade arranged substantially parallel to the arm and,
 (g) connecting means connecting the blade to the valve means through the guideway and actuatable by the frictional contact of the moving blade with the windshield to alternate the valve means between its first and second positions responsively to the direction of motion of the blade, thereby directing a jet of cleaning fluid against the windshield in a location ahead of the blade.

2. The combination windshield wiper blade and washing assembly of claim 1 wherein the valve means comprises a valve element having a width less than the width of the chamber, positioned in sliding contact with the chamber floor and seated across the guideway therein, the end walls of the valve element being seatable alternately against the discharge ports, and the connecting means extending through the guideway for attachment to the wiper blade.

3. The combination wiper blade and washer assembly of claim 2 including spring means resiliently bearing against the upper surface of the valve element for maintaining the same in sealing engagement with the guideway in the bottom of the chamber, as well as with the discharge ports in the sides thereof.

4. The combination wiper blade and washer assembly of claim 2 including spring means resiliently bearing against the upper surface of the valve element for maintaining the same in sealing engagement with the guideway in the bottom of the chamber, as well as with the discharge ports, the spring means comprising an elongated leaf spring extending substantially the length of the chamber and having serrated opposite side margins.

5. The combination of claim 1 wherein the lower portion of the chamber includes an arcuate valve seat and wherein the valve means comprises a valve core having an arcuate upper surface in sliding contact with the valve seat, the valve core having a recess extending the length of the core and communicating with the chamber, the valve core further having at least one transverse bore communicating with the recess and aligned with the discharge ports, the connecting means being fixed to the valve core for angular motion thereof with oscillation of the change of direction of the wiper blade.

References Cited

UNITED STATES PATENTS

| | | | |
|---|---|---|---|
| 2,763,023 | 9/1956 | Horton | 15—250.04 |
| 3,008,171 | 11/1961 | Kelley et al. | 15—250.04 |
| 3,143,753 | 8/1964 | Torelv | 15—250.04 |
| 3,192,550 | 7/1965 | Ziegler | 15—250.04 |

PETER FELDMAN, *Primary Examiner.*

U.S. Cl. X.R.

15—250.33